United States Patent Office.

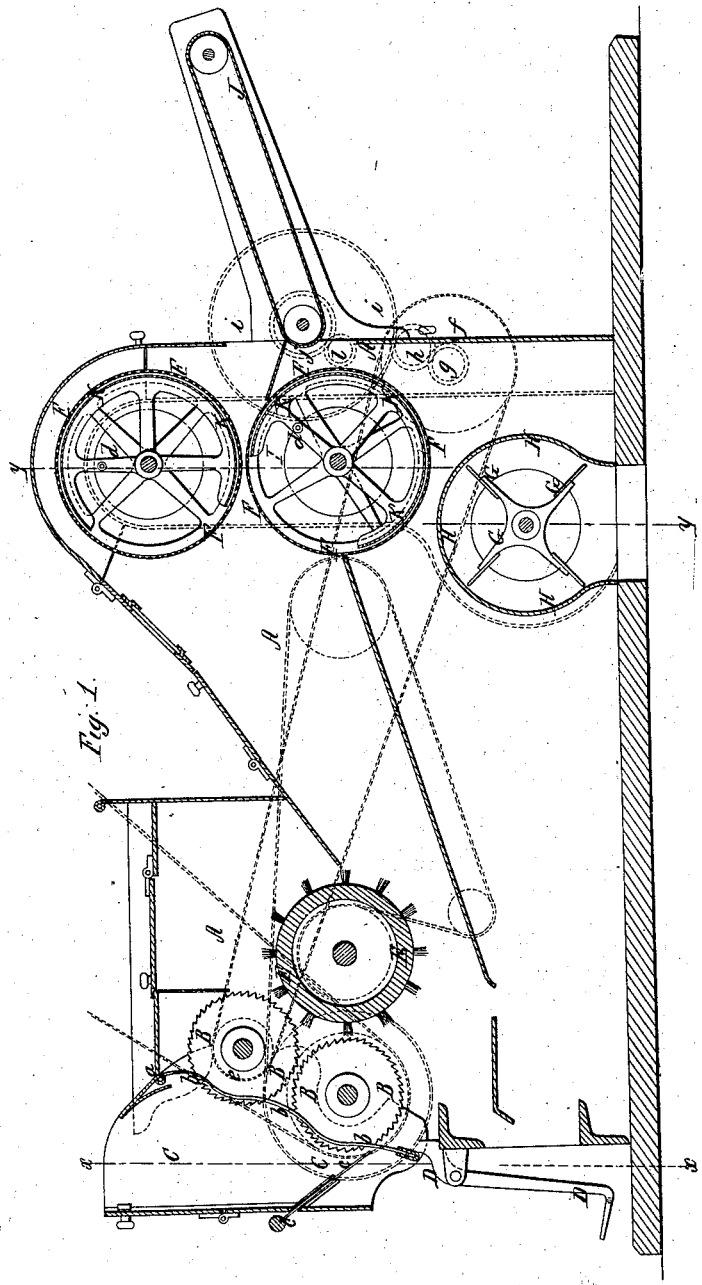

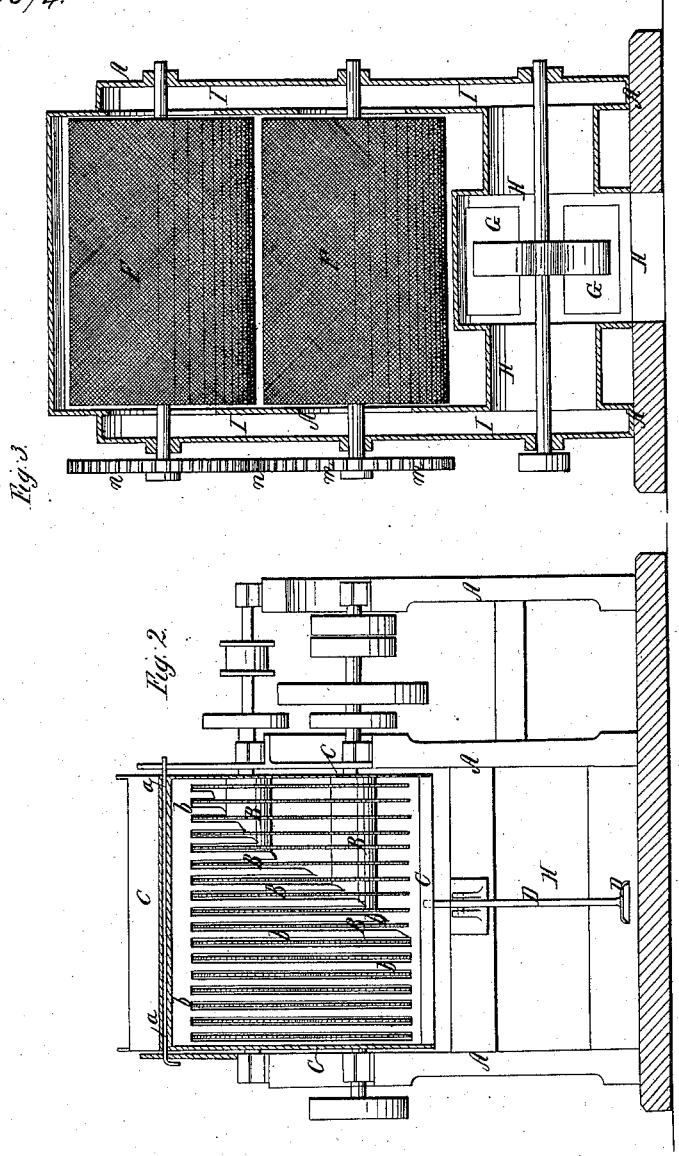

BENJAMIN DOBSON AND WILLIAM SLATER, OF BOLTON, ENGLAND.

*Letters Patent No. 88,374, dated March 30, 1869.*

IMPROVEMENT IN COTTON-GINS.

The Schedule referred to in these Letters Patent and making part of the same.

*To all whom it may concern:*

Be it known that we, BENJAMIN DOBSON, of Bolton, in the county of Lancaster, in England, machine-maker, and WILLIAM SLATER, of the same place, manager, have invented certain new and useful Improvements in "Machinery for Ginning Cotton;" and we hereby declare the following to be a full, clear, and exact description thereof, which will enable others skilled in the art to make and use the same, reference being had to the accompanying drawings, forming part of this specification, in which—

Figure 1 represents a vertical longitudinal section of our improved cotton-gin.

Figure 2 is a vertical transverse section of the same, taken on the plane of the line x x, fig. 1.

Figure 3 is a vertical transverse section of the same, taken on the plane of the line y y, fig. 1.

Similar letters of reference indicate corresponding parts.

Our invention consists—

First, in applying to saw-gins which are provided with one or two sets of saws, a treadle-lever, by which the feeding-hopper may be agitated to clear the teeth of the saws, and to discharge the seeds and impurities, so that when such treadle is used, the hands of the operator may remain at liberty.

Secondly, in applying to saw-gins which are provided with one or two sets of saws, a fan and two perforated metal cylinders, in which a partial vacuum is formed by the fan, to withdraw dust and other impurities from the ginned cotton passing over said cylinders.

Thirdly, in applying to and within the aforesaid perforated cylinders, stationary dampers, by which the action of the vacuum is destroyed on those parts of the cylinder which deposit the cotton upon a feed-apron, or other suitable apparatus.

In order that our invention may be fully understood, and readily carried into operation, we will proceed to describe the accompanying drawing with reference to the letters and figures marked thereon.

In the stationary frame A of the gin, are the bearings of one or two sets of saws, B B, said saws being mounted on their axles, at suitable distances apart, as shown in fig. 2.

Near the front end of the frame A, is pivoted to the same, by a pivot, or hinge-pin, $a$, the hopper C, which has an inner slotted plate, or grid, $b$, which, with its slots, fits between the saws, as is clearly shown in figs. 1 and 2.

The bottom of the hopper is formed by an inclined sliding plate, $c$, which has a toothed inner and lower edge, between which teeth the seeds liberated from the cotton-fibre can drop to the ground.

The hinged or pivoted hopper can be agitated occasionally by the foot of the attendant, acting on a treadle-lever, D, which is pivoted to the frame A, as shown in fig. 1.

The object of thus agitating the hopper, is to clear the teeth of the saws, by drawing the grid forward, and to discharge the seeds and impurities, and to then let the weight of the hopper cause the grid to fall back again.

The treadle-lever is easy to work by the foot of the attendant, whose hands are left at liberty, whereas, the former plan of agitating the hopper by hand was very laborious.

E is the revolving brush, for stripping the fibres off the saws, as usual.

F F are two cylinders, the circumferences of which are made of wire cloth, or perforated sheet-metal. Their bearings are in the sides of the frame A, as indicated in fig. 3.

A partial vacuum is formed in the cylinder F F by a rotary fan, G, the ends of the cylinder being in communication with the case H of the fan by side-trunks, or pipes, I, as in fig. 3, and as in scutchers for cleaning cotton, of the ordinary construction.

The partial vacuum thus produced, removes the dust and light impurities from the fibres of cotton, which are stripped off the saws B B, and thrown, by the centrifugal force of the brush E, against the peripheries of the cylinders F F, between which they pass.

The fibres are then delivered, in the form of a fleece, on a lattice-cloth, or creeper, J, or other suitable device.

The dust is discharged by the fan, instead of being allowed to contaminate the air in the ginning-room.

With the perforated cylinders F, are arranged fixed dampers, K K, which are sheet-metal curved plates, held stationary by bolts $d$, or otherwise, opposite the discharging-sides of the cylinders, as shown in fig. 1.

The object of these dampers is to prevent the partial vacuum above referred to, from causing the fibres to adhere to the peripheries of the cylinders F, at the delivering-end of the machine, for it is evident that if these dampers were not applied in the manner and positions shown, the currents of air passing from the exterior to the interior of the cylinders, would hold the fibres against the cylinders, and would impede, if not entirely prevent them from being delivered on to the creeper J.

The requisite rotary motion is given to the lattice-cloth, or creeper, and to the perforated cylinders F, in the following manner:

To the axle of the upper set of saws, B, is fixed a pulley, $e$, driving, by a strap, the pulley $f$, to the boss of which is fixed a pinion, $g$, gearing into the carrier $h$, which drives the wheel $i$ on the axle of the creeper-shaft. To this shaft is also fixed a pinion, $j$, gearing into a carrier, $l$, which drives a toothed wheel, $m$, on the lower perforated cylinder F, and this wheel $m$ gears into another wheel, $n$, on the upper perforated cylinder F. Any other driving-mechanism may, however, be used.

Having thus stated the nature of our invention, and described a convenient manner of performing the same, we wish it to be understood that we do not intend to limit ourselves to the details given, as in some cases the fan and perforated cylinders, with the dampers, may be applied to saw-gins having only one set of saws. We would also observe that we make no claim to any of the well-known parts of the machine shown in the drawing; but

What we claim as new, and desire to secure by Letters Patent, is—

1. The application of the treadle-lever D, for agitating the hopper C and grid b, and for clearing the teeth of the saws of saw-gins, substantially as herein shown and described, for the purpose of liberating the hands of the operator, as specified.

2. The application of two perforated cylinders, F F, to a cotton-gin, which cylinders are connected with a fan, G, in such manner that a partial vacuum is produced in them, substantially as and for the purpose herein shown and described.

3. The arrangement of the stationary dampers K K within the rotating perforated cylinders F F, to operate substantially as and for the purpose herein shown and described.

In testimony whereof, we have hereunto set our hands, before two subscribing witnesses.

BENJ'N DOBSON.
WILLIAM SLATER.

Witnesses:
H. B. BARLOW,
   *Patent Agent, Manchester.*
H. B. BARLOW, Jr.,
   *Patent Agent, Manchester.*